(12) United States Patent
Palmero

(10) Patent No.: US 6,531,798 B1
(45) Date of Patent: Mar. 11, 2003

(54) LINEAR/ROTARY MOTOR AND METHOD OF USE

(75) Inventor: Albert Palmero, Middlefield, CT (US)

(73) Assignee: Tri-Tech, Inc, Waterbury, CT (US)

(*) Notice: Subject to any disclaimer, the term of this patent is extended or adjusted under 35 U.S.C. 154(b) by 0 days.

(21) Appl. No.: 09/622,851

(22) PCT Filed: Feb. 24, 1999

(86) PCT No.: PCT/US99/04022

§ 371 (c)(1),
(2), (4) Date: Aug. 28, 2000

(87) PCT Pub. No.: WO99/44274

PCT Pub. Date: Sep. 2, 1999

(51) Int. Cl.[7] .......................... H02K 7/20; H02K 41/00; H02K 7/06; F16H 1/20
(52) U.S. Cl. .......................... 310/112; 310/12; 310/80; 74/89.29; 74/490.03
(58) Field of Search .............................. 310/12, 15, 20, 310/36, 37, 75 D, 75 R, 80, 83, 112, 114; 318/35, 135, 115; 901/23; 74/89.31, 89.29, 89.34, 89.3, 665 A, 665 B, 665 D, 665 E, 665 R, 661, 724; 335/267

(56) References Cited

U.S. PATENT DOCUMENTS

| | | | | |
|---|---|---|---|---|
| 3,407,680 A | * | 10/1968 | Westmoreland | ............... 310/80 |
| 4,521,707 A | * | 6/1985 | Baker | ............... 310/80 |
| 4,607,180 A | * | 8/1986 | Stoody | ............... 310/80 |
| 4,614,128 A | * | 9/1986 | Fickler | ............... 74/424.8 B |
| 5,099,161 A | * | 3/1992 | Wolfbauer, III | ............... 310/80 |
| 5,966,988 A | * | 10/1999 | Aiso et al. | ............... 74/89.15 |
| 6,222,294 B1 | * | 4/2001 | Stacy et al. | ............... 310/112 |
| 6,362,547 B1 | * | 3/2002 | Peterson et al. | ............... 310/12 |

* cited by examiner

Primary Examiner—Dang Dinh Le
(74) Attorney, Agent, or Firm—John H. Crozier

(57) ABSTRACT

In a preferred embodiment, a linear/rotary motor, including: first and second stator structures, having magnetically coupled thereto, respectively, first and second rotors; a first, externally threaded shaft fixedly attached to the first rotor and extending axially therefrom, such that rotation of the first rotor causes rotation of the first, externally threaded shaft; a second shaft, having a splined external surface, extending through a complementarily shaped opening defined through the second rotor, and axially movable with respect thereto, such that rotation of the second rotor causes rotation of the second shaft; and the second shaft including threaded apparatus cooperatively engaging the first, externally threaded shaft, such that rotation of the first, threaded shaft can cause linear motion of the second, cylindrical shaft. The motor can be operated to provide rotary, linear, or simultaneous rotary and linear motion of the second shaft.

11 Claims, 2 Drawing Sheets

LINEAR/ROTARY MOTOR AND METHOD OF USE

CROSS-REFERENCE TO RELATED APPLICATIONS

The present application is a 371 of PCT Application Serial Number PCT US99/04022, filed Feb. 24, 1999, which claimed priority of U.S. Ser. No. 09/030,781, filed Feb. 26, 1998.

TECHNICAL FIELD

The present invention relates to electric motors generally and, more particularly, but not by way of limitation, to a novel electric motor which provides both linear and/or rotary motion at a single output shaft.

BACKGROUND ART

In certain applications, it is desirable to have a shaft which may selectively rotate and/or reciprocate. Such an application, for example, is in the robotic picking and placing of components where it may be required to axially move a component to an insertion position and then rotate the component to screw it in place. Conventional motor arrangements are often complicated and heavy, a substantial disadvantage for robotics applications. Another type of application requiring a shaft which may selectively rotate and/or reciprocate is in the precise control of laparoscopic and other such medical instruments.

In either type of application, it is frequently required that the linear motion be locked while rotary motion takes place. For a rotary/linear motor, this makes it desirable that the linear and rotary motions be controllable independently of one another.

A problem with motors having linear motion is that the motors frequently provide inadequate output shaft support when heavy side loads are imposed on the output shafts thereof.

Accordingly, it is a principal object of the present invention to provide an electric motor which provides both linear and/or rotary motion at a single output shaft.

It is an additional object of the invention to provide such an electric motor in which linear and rotary motions are controllable independently of one another.

It is a further object of the invention to provide such a motor that is simple and economical to manufacture.

An additional object of the invention is to provide such a motor that is lightweight and compact.

Other objects of the present invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, a linear/rotary motor, comprising: first and second stator structures, having magnetically coupled thereto, respectively, first and second rotors; a first, externally threaded shaft fixedly attached to said first rotor and extending axially therefrom, such that rotation of said first rotor causes rotation of said first, externally threaded shaft; a second shaft, having a splined external surface, extending through a complementarily shaped opening defined through said second rotor, and axially movable with respect thereto, such that rotation of said second rotor causes rotation of said second shaft; and said second shaft including threaded means cooperatively engaging said first, externally threaded shaft, such that rotation of said first, threaded shaft can cause linear motion of said second, cylindrical shaft. Said motor can be operated to provide rotary, linear, or simultaneous rotary and linear motion of said second shaft.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, and on which.

BEST MODE FOR CARRYING OUT THE INVENTION

Figure 1:
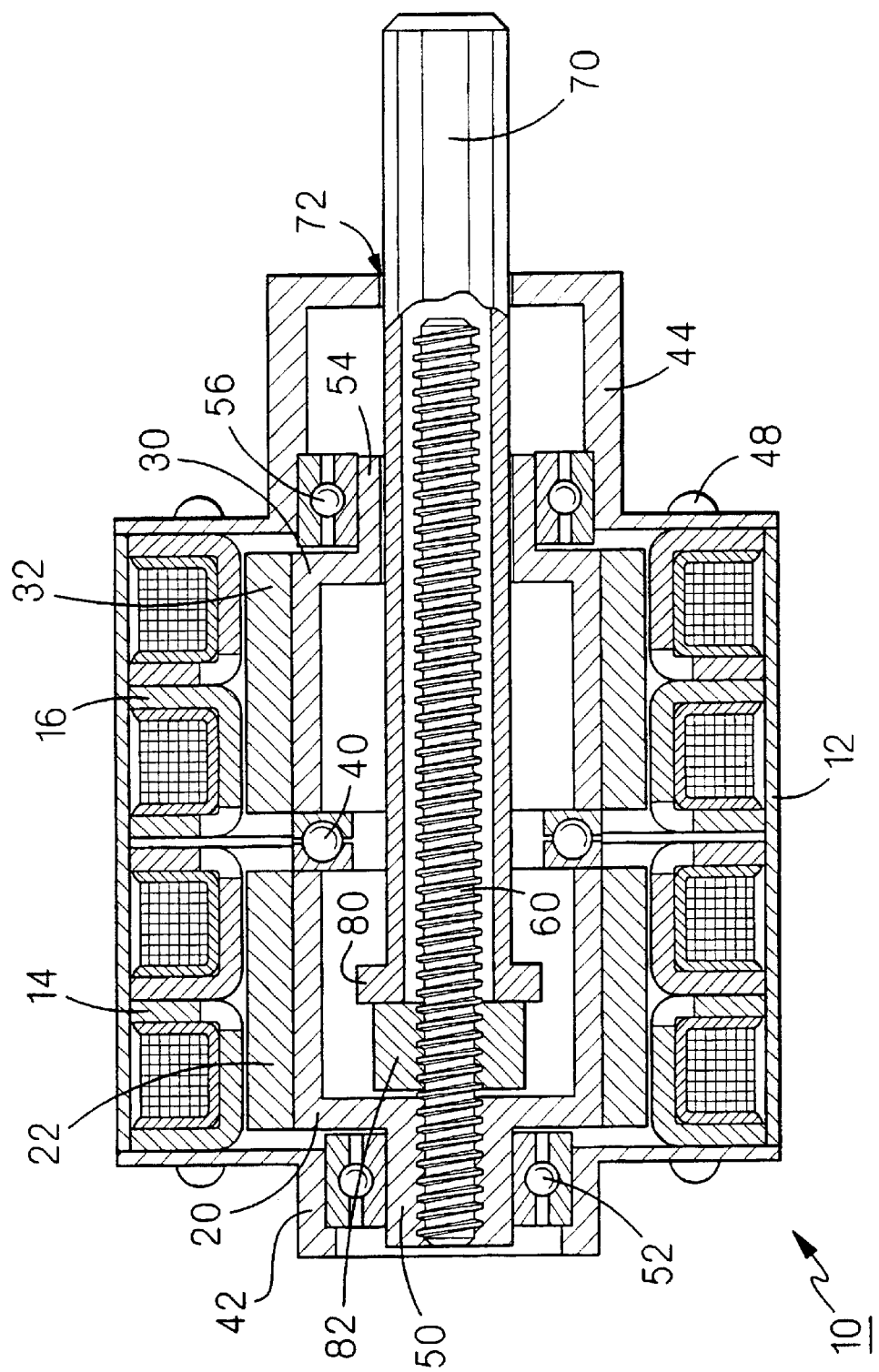
FIG. 1 is is a side elevational view, partially in cross-section and partially cut-away, of a linear/rotary motor constructed according to the present invention.

Reference should now be made to the drawing figures, on which similar or identical elements are given consistent identifying numerals throughout the various figures, and on which parenthetical references to figure numbers direct the reader to the view(s) on which the element(s) being described is (are) best seen, although the element(s) may be seen also on other views.

FIG. 1 illustrates a linear/rotary motor, constructed according to the present invention, and generally indicated by the reference numeral 10.

Motor 10 includes a generally cylindrical housing 12 having disposed interiorly thereof first and second annular stator structures 14 and 16 of conventional construction. Disposed interiorly of first stator structure 14 is a cup-shaped rotor 20 having attached to the outer periphery thereof an annular magnet 22. Annular magnet 22 is in magnetically interacting proximity to first stator structure 14. Disposed interiorly of second stator structure 16 is a cup-shaped rotor 30 having attached to the outer periphery thereof an annular magnet 32. Annular magnet 32 is in magnetically interacting proximity to first stator structure 16. The open ends of rotor cups 20 and 30 therebetween and fixed to housing 12. A first end closure 42 covers the end of motor 10 adjacent first stator structure 14 and a second end closure 44 covers the end of motor 10 adjacent second stator structure 16. The elements of motor 10 are secured together by means of a plurality of bolts, as at 48.

The closed end 50 of rotor cup 20 is journaled in a rear bearing 52 fixed to first end closure structure 42, while the closed end 54 of rotor cup 30 is journaled in a front bearing 56 fixed to second end closure structure 44.

Associated with rotor cup 20 is a threaded shaft 60, having its proximal end fixedly attached to the closed end of rotor cup 20, and extending axially through rotor cups 20 and 30. Associated with rotor cup 30 is a cylindrical shaft 70 having a splined outer surface which engages a complementarily shaped inner surface of the closed end of rotor cup 30, such that rotation of that rotor cup will cause rotation of that shaft. The distal end of shaft 70 passes through a closely fitting opening 72 in second end closure structure 44 and spaced substantially apart from front bearing 56 to support that shaft against radial forces.

Shaft 70 is is telescopingly inserted over the distal end of threaded shaft 60. An annular flange 80 is formed around the proximal end of shaft 70 and has a threaded nut 82 fixedly attached to the flange, the nut having a thread complementary to that of shaft 60 and being in engagement therewith such that rotation of threaded shaft 60 can cause shaft 70 to move axially in and out of motor 10 depending on the direction of rotation of shaft 60.

Motor 10 can be operated in a linear mode, in a rotary mode, or in both modes simultaneously, as is described below.

If a linear mode is desired, rotor cup 30 is electromagnetically locked by second stator structure 16 and rotor cup 20 is rotated by first stator structure 14, with threaded nut 82 causing shaft 70 to telescopingly move along shaft 60 and in or out of housing 12 as rotor cup 20 rotates shaft 60. As shown, clockwise rotation of shaft 60 will cause the distal end of shaft 70 to move to the left on FIG. 1, while counterclockwise rotation of shaft 60 will cause the distal end of shaft 70 to move to the right on FIG. 1. Movement of shaft 70 to the left is terminated when the outer surface of nut 82 engages the inner vertical surface of rotor cup 20, while movement of shaft 70 to the right is terminated when the inner surface of annular flange 80 engages the inner vertical surface of rotor cup 30.

If rotary mode is desired, both first and second rotor cups 20 and 30 are operated at the same speed in the same direction. In this case, since threaded nut 82 will be rotating at the same speed as shaft 60, there will be no linear motion of shaft 70.

If both linear and rotary modes are desired, operating both motors at different speeds in the same direction or in opposite directions will cause shaft 70 to rotate and also to move in or out of front housing 20.

Figure 2:
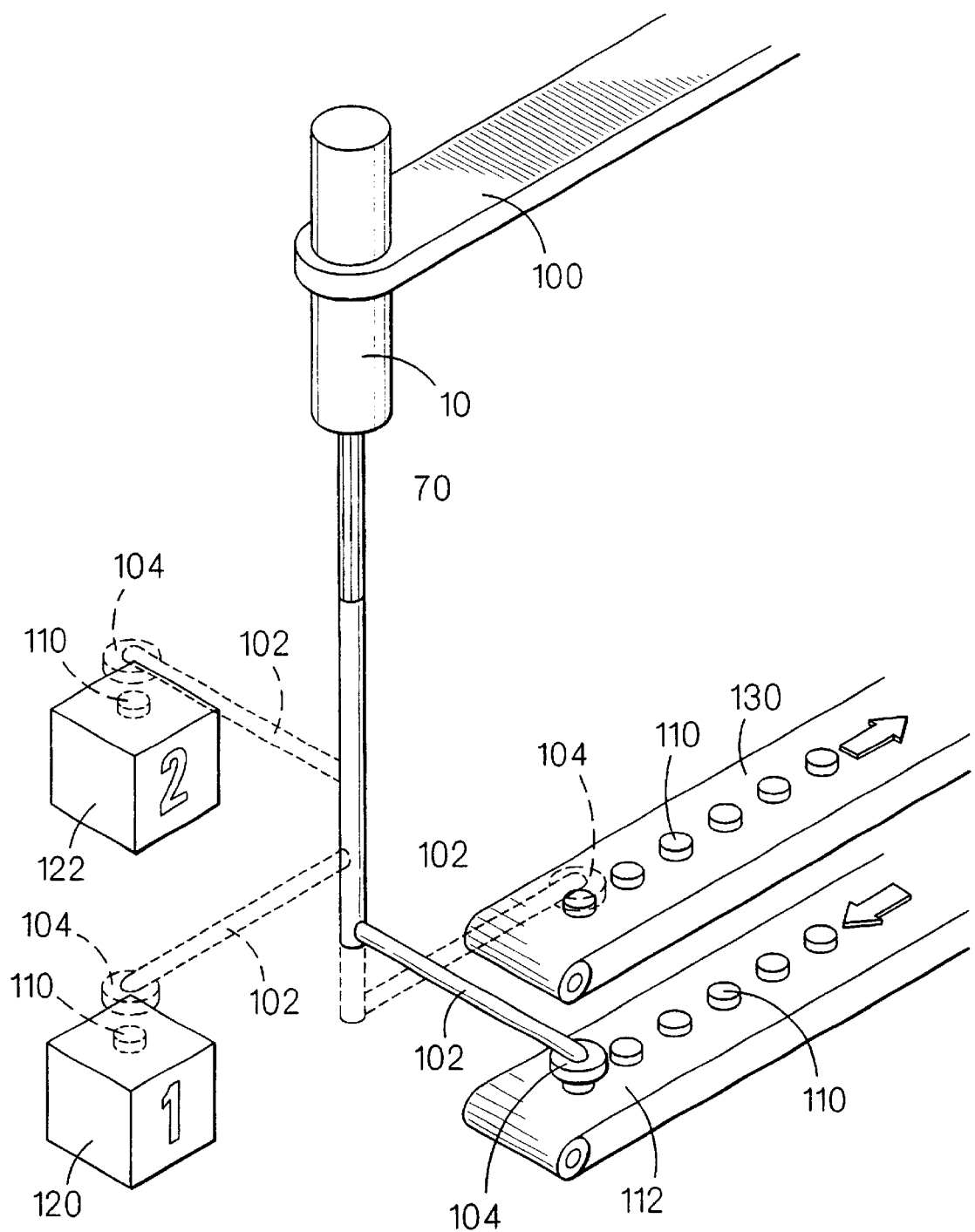
FIG. 2 is an isometric view of a manufacturing operation employing a robotic operator with the linear/rotary motor of FIG. 1.

FIG. 2 illustrates a manufacturing operation employing motor 10 and illustrating the use of both linear and rotary modes of operation. Elements common to those shown on FIG. 1 are given like reference numerals. Here, motor 10 is mounted vertically at the distal end of a robotic arm or other supporting structure 100. A horizontal arm 102 is fixedly attached to the distal end of shaft 70 and an electromagnet 104 is fixedly mounted to the distal end of the horizontal arm. Electromagnet 104 is shown (solid lines) at a first elevation in position to pick up a part, as at 110, from the surface of an incoming conveyor belt 112.

It may be assumed that shaft 70 has been moved axially in a linear mode to the first elevation and shaft 70 rotated in a rotary mode to the pickup position (solid lines). After electromagnet 104 picks up part 110, motor 10 (FIG. 1) is energized in a linear mode to raise arm 102 to a second elevation and shaft 70 is then rotated clockwise by rotary to place part 110 on a first workstation 120. After a manufacturing operation takes place at first workstation 120, part 110 is similarly raised to a third elevation and moved clockwise to a second workstation 122. After completion of the manufacturing operation at second workstation 122, arm 102 is rotated slightly clockwise, lowered to a fourth elevation, and rotated clockwise so that part 110 may be placed on the surface of an outgoing conveyor 130.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A linear/rotary motor, comprising:

(a) first and second stator structures, having magnetically coupled thereto, respectively, first and second rotors;

(b) a first, externally threaded shaft fixedly attached to said first rotor and extending axially therefrom, such that rotation of said first rotor causes rotation of said first, externally threaded shaft;

(c) a second shaft, having a splined external surface, extending through a complementarily shaped opening defined through said second rotor, and axially movable with respect thereto, such that rotation of said second rotor causes rotation of said second shaft;

(d) said second shaft including threaded means cooperatively engaging said first, externally threaded shaft, such that rotation of said first, threaded shaft can cause linear motion of said second, cylindrical shaft; and (e) said first and second rotor structures being adjacent but separated axially at most by a bearing structure.

2. A linear/rotary motor, as defined in claim 1, wherein: said threaded means comprises an internally threaded nut fixedly attached to a proximal end of said second shaft.

3. A linear/rotary motor, as defined in claim 1, wherein:

(a) a proximal end of said first, externally threaded shaft is journaled in a first bearing disposed at an end of said motor adjacent said first stator structure;

(b) said second shaft is journaled intermediate its ends in a second bearing disposed at an end of said motor adjacent said second stator structure; and (c) said second shaft passes through a close fitting support opening defined in a closure of said motor and disposed substantially spaced apart from said second bearing to support said second shaft against radial force.

4. A linear/rotary motor, as defined in claim 1, further comprising: a thrust bearing contactingly disposed between said first and second rotors.

5. A linear/rotary motor, as defined in claim 4, wherein: axial motion of said second shaft in one direction terminates when a proximal end of said second shaft contacts said thrust bearing.

6. A linear/rotary motor, as defined in claim 1, wherein: axial motion of said second shaft terminates when a proximal end of said second shaft contacts an internal surface of said motor.

7. A linear/rotary motor, as defined in claim 1, wherein: an exposed portion of said first shaft does not extend beyond an end of said motor.

8. A method of operating a linear/rotary motor including first and second stator structures, having magnetically coupled thereto, respectively, first and second rotors; a first, externally threaded shaft fixedly attached to said first rotor and extending axially therefrom, such what rotation of said first rotor causes rotation of said first, externally threaded shaft; a second shaft, having a splined external surface, extending through complementarily shaped opening defined in said second rotor, and axially movable with respect thereto, such that rotation of said second rotor causes rotation of said second shaft; and said second shaft including threaded means cooperatively engaging said first, externally threaded shaft, such that rotation of said first, threaded shaft can cause linear motion of said second, cylindrical shaft, said first and second rotor structures being adjacent but separated axially at most by a bearing structure, said method comprising selecting an operating mode from the group consisting of:

(a) electromagnetically locking said second rotor with said second stator structure and rotating said first rotor with said first stator structure, with said threaded means causing said second shaft to move axially telescopingly relative to said first shaft;

(b) causing said first rotor to be rotated with said first stator structure and said second rotor to be rotated said second stator structure, at a common speed, so as to rotate said first and second shafts at the same speed, with no axial movement of said second shaft relative to said first shaft; and (c) causing said first rotor to be rotated with said first stator structure at a first speed and causing said second rotor to be rotated with said second stator structure at a second speed, with said second shaft both rotating and moving axially relative to said first shaft.

9. A method of operating a linear/rotary motor, as defined in claim 8, wherein mode (c) further comprises: rotating said first and second shafts in a common direction.

10. A method of operating a linear/rotary motor, as defined in claim 8, wherein mode (c) further comprises: rotating said first and second shafts in opposite directions.

11. A method of operating a linear/rotary motor, as defined in claim 8, further comprising: providing said first shaft such that and exposed portion of said first shaft does not extend beyond an end of said motor.

* * * * *